United States Patent
Lee et al.

(10) Patent No.: US 8,264,635 B2
(45) Date of Patent: Sep. 11, 2012

(54) LIQUID CRYSTAL DISPLAY HAVING A TOP CASE WITH FIRST AND SECOND FRAME MEMBERS THAT ARE PHYSICALLY SEPARATED

(75) Inventors: Kyuheon Lee, Gyeonggi-do (KR); Jongki Ahn, Daegu (KR); Woojin Kim, Gyeonggi-do (KR); Daesung Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 287 days.

(21) Appl. No.: 12/621,888

(22) Filed: Nov. 19, 2009

(65) Prior Publication Data
US 2010/0328568 A1   Dec. 30, 2010

(30) Foreign Application Priority Data
Jun. 24, 2009   (KR) .................. 10-2009-0056587

(51) Int. Cl.
  *G02F 1/1333* (2006.01)
  *G02F 1/1345* (2006.01)
(52) U.S. Cl. .................................. 349/58; 349/150
(58) Field of Classification Search .............. 349/58–60, 349/150
  See application file for complete search history.

(56) References Cited

U.S. PATENT DOCUMENTS

| | | | |
|---|---|---|---|
| 6,380,998 B1 * | 4/2002 | Arai ............................ | 349/152 |
| 6,504,586 B1 * | 1/2003 | Lee ............................. | 349/58 |
| 6,525,790 B1 * | 2/2003 | Kan-o .......................... | 349/58 |
| 7,178,968 B2 | 2/2007 | Sugahara et al. | |
| 2005/0083646 A1 * | 4/2005 | Bae et al. ...................... | 361/686 |
| 2005/0141245 A1 * | 6/2005 | Sugahara et al. ............. | 362/633 |
| 2006/0023141 A1 * | 2/2006 | Oka ............................. | 349/58 |
| 2008/0273136 A1 * | 11/2008 | Hisada ......................... | 349/58 |
| 2008/0297681 A1 * | 12/2008 | Yang et al. .................... | 349/58 |
| 2009/0135329 A1 * | 5/2009 | Kim ............................. | 349/58 |

FOREIGN PATENT DOCUMENTS
CN   1435713   8/2003

* cited by examiner

*Primary Examiner* — Jessica M Merlin
(74) *Attorney, Agent, or Firm* — Moragn, Lewis & Bockius LLP

(57) ABSTRACT

A liquid crystal display is provided to improve workability for fastening and reduce production costs. The liquid crystal display includes: a liquid crystal panel; a film member having a source IC for driving the liquid crystal panel mounted therein; a source PCB electrically connected to the liquid crystal panel through the film member; lamps for generating light; a panel guide having a guide space where the source PCB is positioned provided on an upper outer surface thereof; a bottom cover; and a top case having a first frame member surrounding both of the film member and the source PCB and fixing the liquid crystal panel at a portion of the upper side of the liquid crystal panel and a plurality of frame members physically separated from the first frame member and fixing the liquid crystal panel at a portion of the lower side of the liquid crystal panel.

12 Claims, 12 Drawing Sheets phil# LIQUID CRYSTAL DISPLAY HAVING A TOP CASE WITH FIRST AND SECOND FRAME MEMBERS THAT ARE PHYSICALLY SEPARATED This application claims the benefit of Korean Patent Application NO. 10-2009-0056587 filed on Jun. 24, 2009, which is incorporated herein by reference for all purposes as if fully set forth herein.

BACKGROUND OF THE INVENTION

1. Field of the Invention

This document relates to a liquid crystal display, and more particularly, to a liquid crystal display which can reduce material cost.

2. Discussion of the Related Art

In the recent information society, the importance of display devices serving as a visual information medium is increasing. However, it was a large problem in cathode ray tubes that were mainly used as the display device in that their weight and the size were large. Accordingly, many kinds of flat panel display devices have been recently developed so as to solve the problems of the cathode ray tubes.

Examples of the flat panel display devices include a liquid crystal display (LCD), a field emission display (FED), a plasma display panel (PDP), and an electro-luminescence (EL). Most of the flat panel display devices have been put to practical use and have been put on the market.

Out of the flat panel display devices, the application range of the liquid crystal display has widened because the liquid crystal display can be manufactured to be light and thin and can be driven under low power consumption. Accordingly, the liquid crystal display has been used as a personal computer such as a notebook PC, office automation equipment, audio/video equipment, an interior/outdoor advertising display device, a navigation device, a rear sensor, etc. The liquid crystal display displays a desired image on the screen by controlling the transmission amount of light beam depending on video signals applied to a plurality of control switches arranged in a matrix format. The liquid crystal display has been rapidly advanced toward a larger size and higher resolution owing to recent security of mass production technologies and recent results of research and development.

As shown in FIG. 1, the liquid crystal display includes a liquid crystal panel 2 connected to driving circuits and displaying an image, a holding member 3 for holding the liquid crystal panel 2, and a top case 1 surrounding edges of the liquid crystal panel 2 and the holding member 3. A backlight unit for irradiating light onto the liquid crystal panel 2 is further held in the holding member 3. The top case 1 protects the liquid crystal panel 2 from an external impact.

The top case 1 is manufactured in a rectangular frame shape in accordance with the size of the liquid crystal panel 2. As the liquid crystal panel 2 increases in size, the size of the top case 1 also increases. Therefore, the top case 1 having a conventional rectangular frame shape may be deteriorated in workability due to poor assembly efficiency, and increases production costs such as material cost and packaging cost. Especially, with the recent trend of a large-sized liquid crystal panel 2, a long-axis part and a short-axis part constituting the top case 1 are separately manufactured and then the long-axis part and the short-axis part are welded or screwed as shown in FIG. 2, and this results in additional cost for welding or screwing.

SUMMARY OF THE INVENTION

An aspect of this document is to provide a liquid crystal display which can improve workability and reduce production costs.

To accomplish the above aspect, there is provided a liquid crystal display according to an exemplary embodiment of the present invention, including: a liquid crystal panel; a film member having a source IC for driving the liquid crystal panel mounted therein; a source PCB electrically connected to the liquid crystal panel through the film member; lamps for generating light to be irradiated onto the liquid crystal panel; a panel guide guiding the liquid crystal panel so as to be stacked in a rectangular frame shape and having a guide space where the source PCB is positioned provided on an upper outer surface thereof; a bottom cover holding the lamps, and covering a portion of the sides of the panel guide; and a top case having a first frame member surrounding both of the film member and the source PCB and the liquid crystal panel at a portion of the upper side of the liquid crystal panel and a plurality of second frame members physically separated from the first frame member and fixing the liquid crystal panel at a portion of the lower side of the liquid crystal panel.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

In the drawings.

DETAILED DESCRIPTION OF THE PREFERRED EMBODIMENTS

Figure 1:
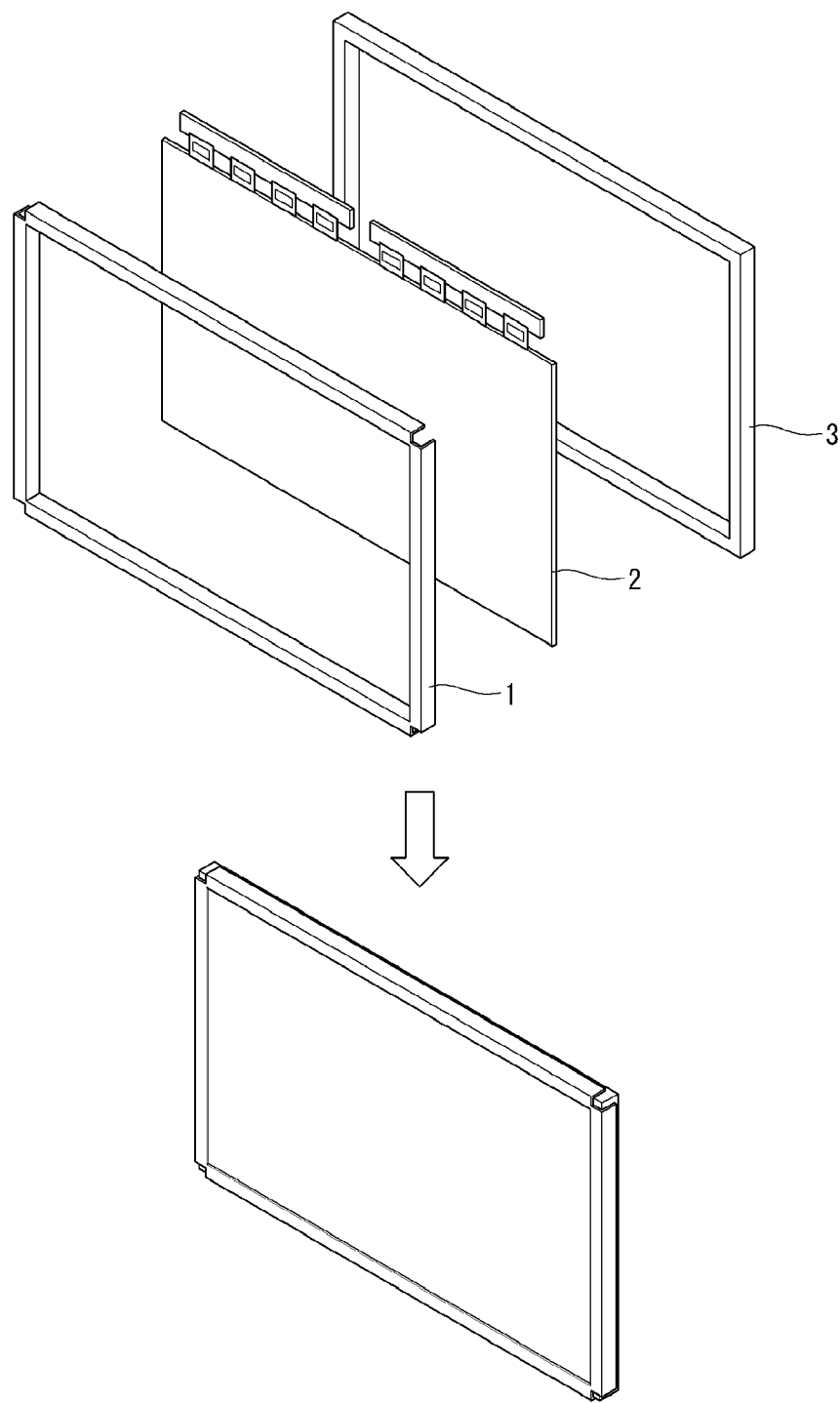
FIG. 1 is a schematic exploded perspective view of a conventional liquid crystal display.
Figure 2:
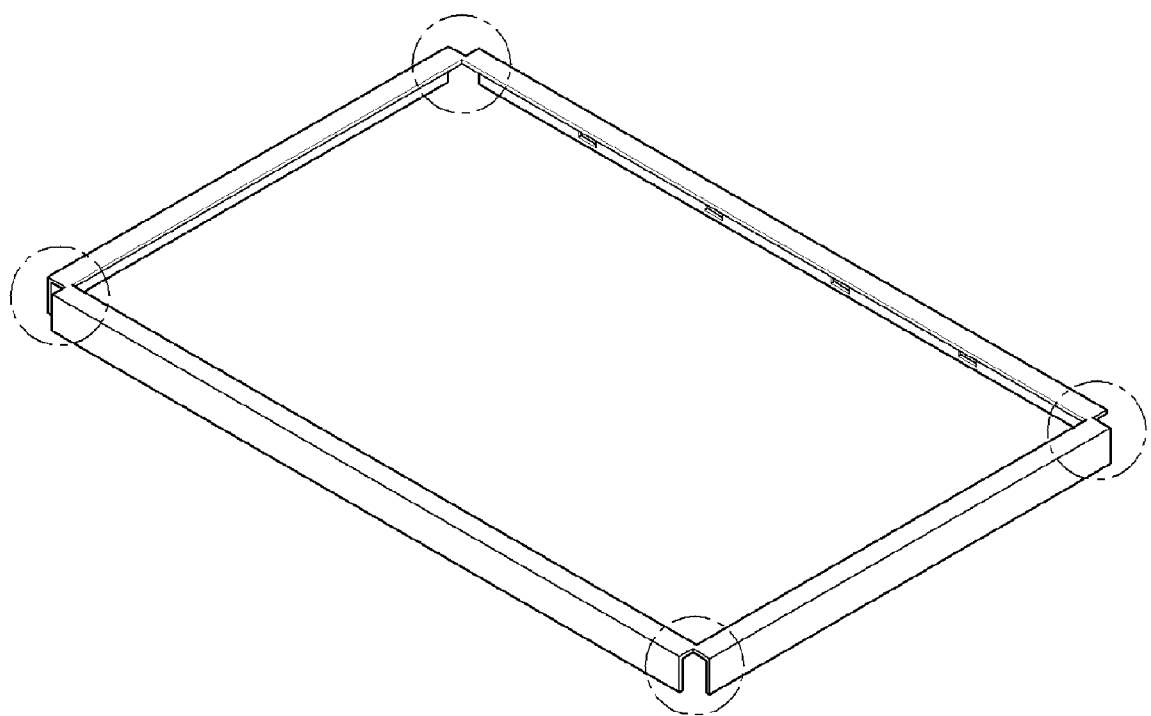
FIG. 2 is a view showing a top case of FIG. 1.
Figure 3:
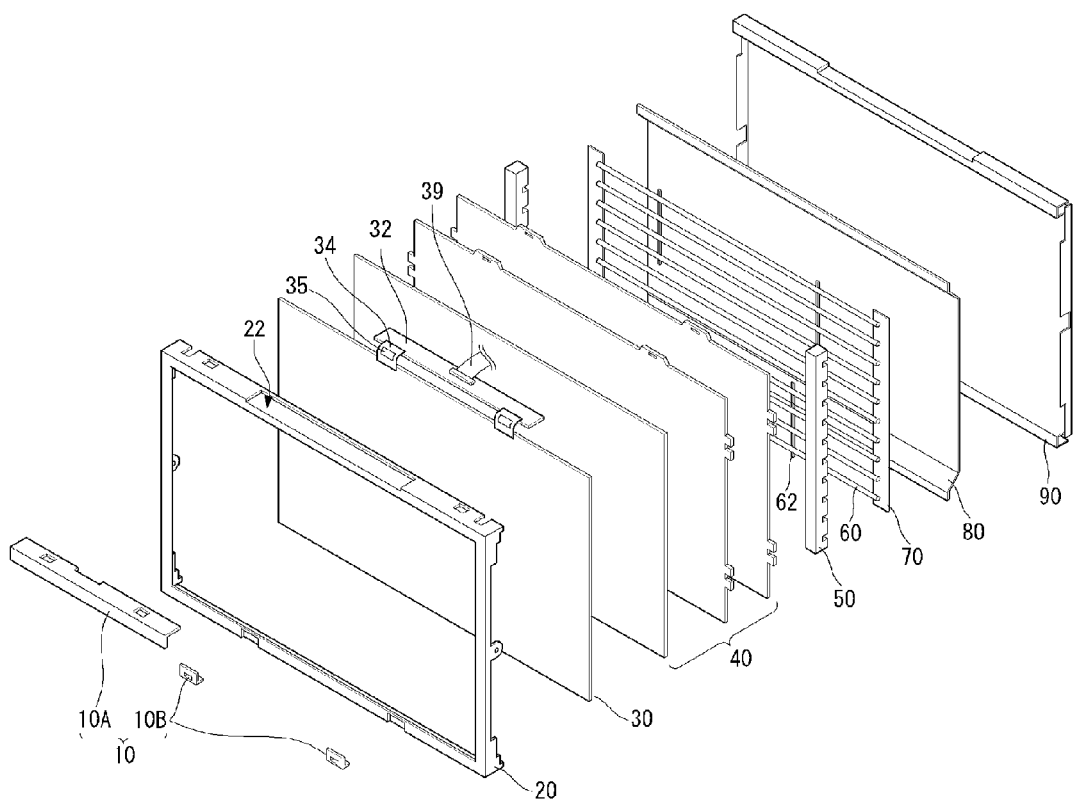
FIG. 3 is an exploded perspective view of a liquid crystal display according to the present invention.

Hereinafter, an implementation of this document will be described in detail with reference to FIGS. 3 to 14.

Referring to FIGS. 3 to 12, a liquid crystal display according to the implementation of the present invention includes a top case 10, a panel guide 20, a liquid crystal panel 30, a driving circuit portion 32, 34, and 35, and a backlight unit 40, 50, 60, 70, 80, and 90.

The liquid crystal panel 30 includes an upper substrate and a lower substrate. Liquid crystals are interposed between the upper and lower substrates of the liquid crystal panel 30, and a spacer for keeping a gap between the upper and lower substrates constant is formed.

The upper substrate of the liquid crystal panel 30 is provided with color filters, a common electrode, a black matrix, and the like. The common electrode may be formed on the lower substrate according to an electric field method for driving liquid crystals. The lower substrate of the liquid crystal panel 30 is provided with signal lines such as data line and gate lines and thin film transistors (hereinafter, referred to as "TFTs") at crossings of the data lines and the gate lines. The thin film transistor is turned on in response to a scan signal (gate pulse) from the gate lines to supply a data signal from the data lines to a pixel. A pixel electrode is formed in each pixel region between the data lines and the gate lines to receive a data signal.

Data pads are formed at one side of the lower substrate to be connected to the data lines, and gate pads are formed at the other side of the lower substrate to be connected to the gate lines. An upper polarizing sheet is fixed to a front surface of the upper substrate, and a lower polarizing sheet is fixed to a rear surface of the lower substrate. Alignment layers for setting a pre-tilt angle of the liquid crystal in an interface contacting the liquid crystal are respectively formed on the upper and lower glass substrates.

Figure 7:
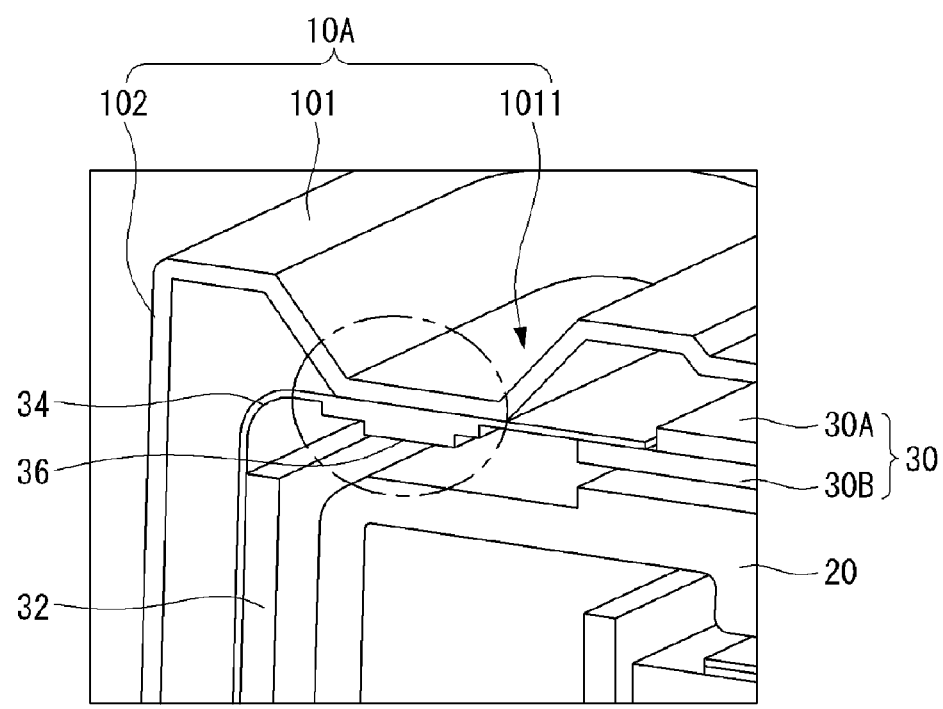
FIG. 7 is a view for explaining a first plane of the first frame member contacting the vicinity of a source COF where a heat dissipation pad is formed.
Figure 8:
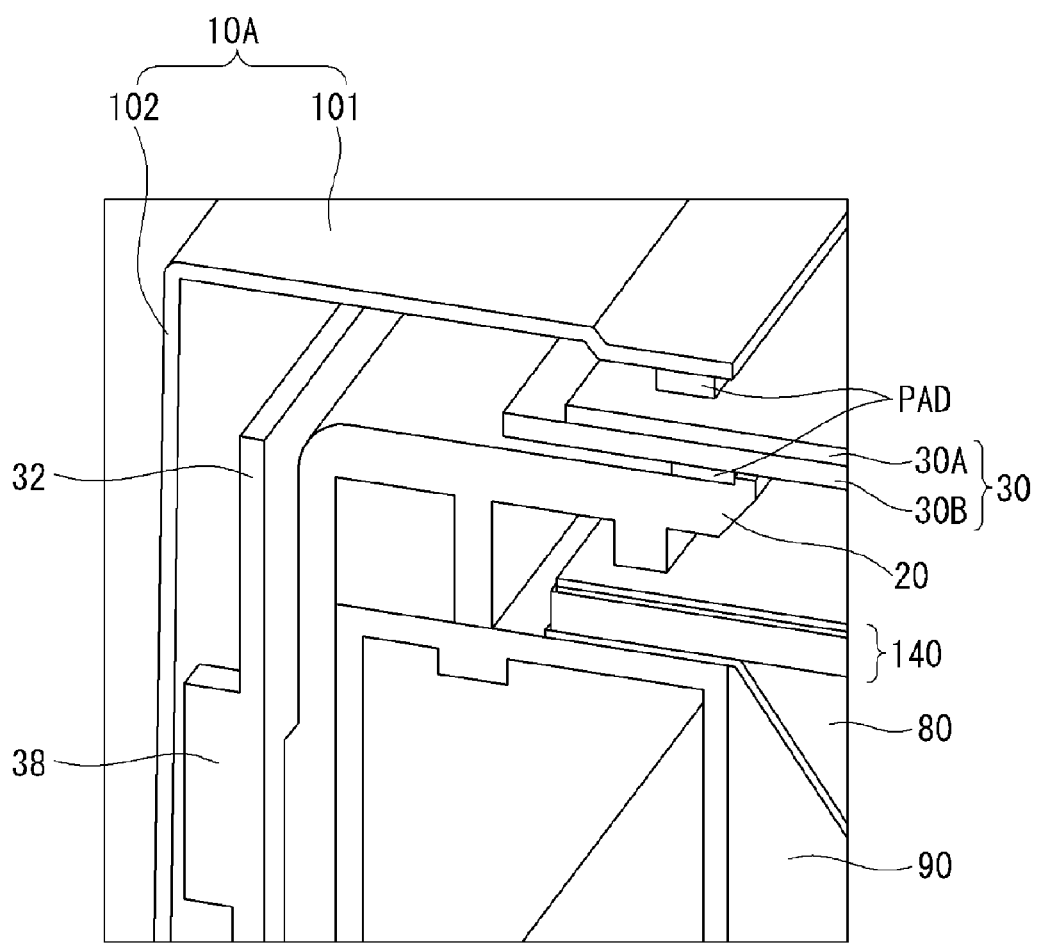
FIG. 8 is a view for explaining a second plane of the first frame member contacting an electromagnetic wave emission pad formed on a source PCB.

The driving circuit portion includes source ICs (Integrated Circuits) 35 for driving the data lines, gate ICs for driving the gate lines, and an inverter for driving the lamps 60. The source ICs 35 are mounted on a source COF (Chip On Film) 34 for electrically connecting the source PCB (Printed Circuit Board) 32 and the data pads of the liquid crystal panel 30. The source COF may be replaced with a source TCP (Taper Carrier Package). A heat dissipation pad 35, as shown in FIG. 7, for dissipating heat of the circuit is bonded to one side of the source COF 34. The source PCB 32 is provided with signal lines for transmitting digital video data received for displaying images and timing control signals to the source COF 34. An electromagnetic wave emission pad 36, as shown in FIG. 8, for protecting the internal circuit from EMI (Electro-Magnetic Interference) is bonded to one side of the source PCB 32. The source PCB 32 is connected to first and second control boards through a connection cable 39. The first control board has a timing controller mounted therein to supply the source PCB 32 with timing control signals for controlling the operation timing of the source ICs 35 and gate ICs along with digital video data. The second control board has a power generating circuit mounted therein to supply the source PCB 32 with driving voltages required for operations of the source ICs 35 and gate ICs. The gate ICs may be formed directly on the lower substrate of the liquid crystal panel 30 simultaneously with the TFTs formed in a pixel array with the use of a gate-in-panel process. Alternatively, the gate ICs may be directly bonded onto the lower glass substrate of the liquid crystal panel 30 by a chip-on-glass method. The gate ICs are electrically connected to the gate pads, and receive timing control signals and driving voltages from the source PCB 32. The inverter is mounted in the second control board and generates driving power required for driving the lamps 60.

The panel guide 20 is molded in a rectangular frame, and side wall surfaces inside the panel guide 20 are molded into a stepped surface and the liquid crystal panel 30 is guided to be stacked on the stepped surface. An upper outer surface of the panel guide 20 is provided with a guide space 22 where the source PCB 32 is located. The source PCB 32 is located in the guide space 22 provided on the upper outer surface of the panel guide 20 in order to realize the thinning of the liquid crystal display.

The backlight unit includes a plurality of lamps 60 irradiating light to the liquid crystal panel 30, lamp guides 62 that fixes the lamps 60 and supports an optical sheet portion 40, a balance board 70 driving the lamps 60 in parallel by reducing an impedance difference between the lamps 60, a side supporter 50 supporting edges of the lamps 60, a bottom cover 90 for holding the lamps 60, the optical sheet portion 40 stacked between the lamps 60 and the liquid crystal panel 30, and a reflective sheet 80 disposed between the lamps 60 and the bottom cover 90.

Examples of the lamp 60 include a cold cathode fluorescent lamp (hereinafter, referred to as "CCFL") and an external electrode fluorescent lamp (hereinafter, referred to as "EEFL"). The balance board 70 is electrically connected to the second control board and supplied with driving power required for driving the lamps 60. The lamp guides 62 include lamp holders partially surrounding the lamps 60 and supports supporting the optical sheet portion 40, respectively, and are disposed in a distributed manner. The side supporter 50 is provided with a plurality of slots 52 through which the ends of the lamps 60 pass. The optical sheet portion 40 includes a diffusion plate for diffusing light from the lamps 60, at least one prism sheet for raising the light emitted from the diffusion plate perpendicularly to the liquid crystal panel 30, and at least one diffusion sheet for diffusing the light emitted from the prism sheet. The bottom cover 90 is provided with a bottom surface, upper, lower, left, and right sides extending from the bottom surface and providing a holding space of the lamps 60, and wing surfaces extending from the upper and lower sides and guiding the optical sheet portion 40 to be stacked. The bottom cover 90 may be formed of a metal material or a plastic material. The bottom cover 90 covers a portion of the rectangular frame of the panel guide 20. The reflective sheet 80 reflects light traveling from the plurality of lamps 60 toward the bottom cover 90, and thus the efficiency of light irradiated onto the liquid crystal panel 30 can be improved. The reflective sheet 80 may be formed as a single layer having a reflective material corresponding to the bottom cover 90 having a metal material. Alternatively, the reflective sheet 80 may be formed as a double layer, i.e., a first layer having a reflective material and a second layer having a conductive material, corresponding to the bottom cover 90 having a plastic material. The reflective sheet 80 having a double layer will be described later with reference to FIGS. 13 and 14.

Figure 4:
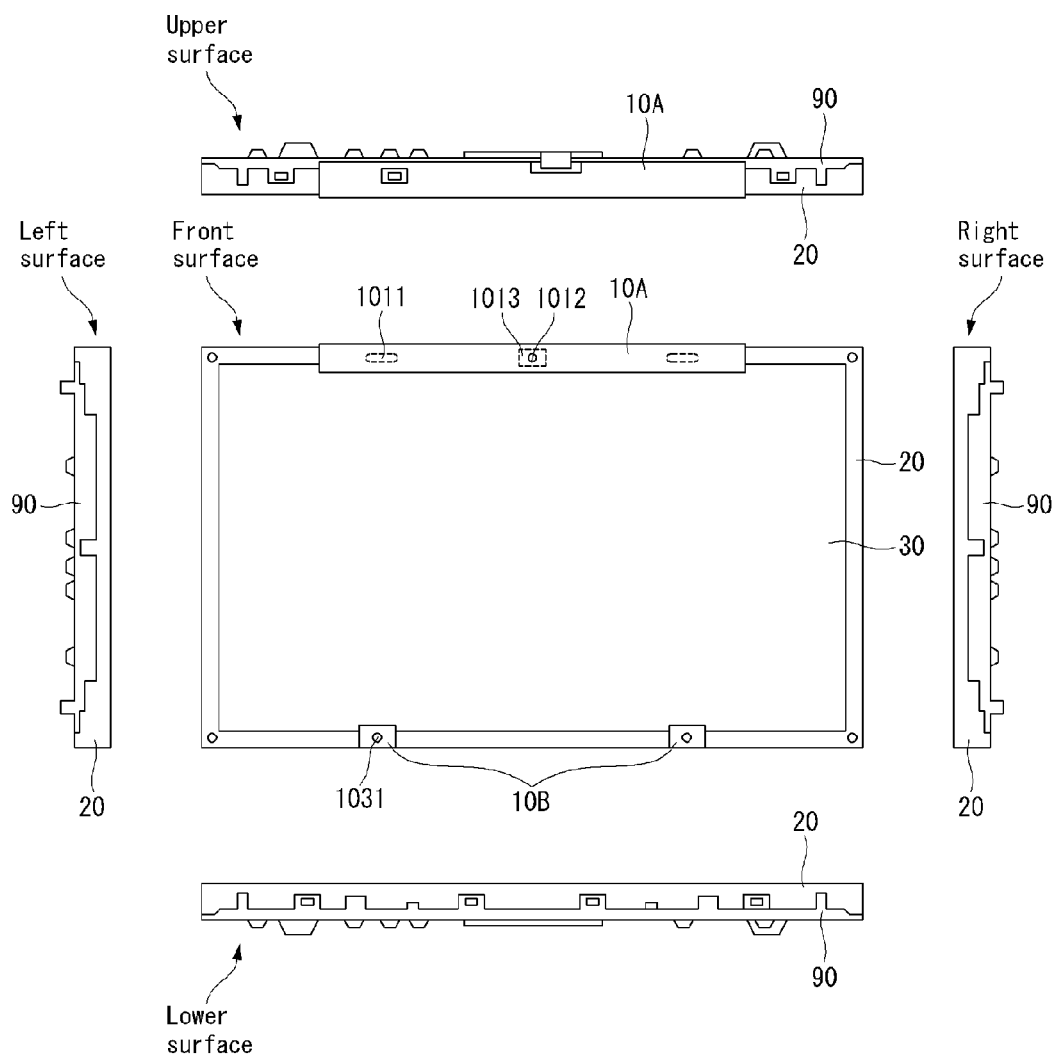
FIG. 4 is a view showing a front face and upper, lower, left, and right sides of the liquid crystal display in an assembled state.

As shown in FIG. 4, the top case 10 includes a first frame member 10A which surrounds a portion of the upper surface of the panel guide 20 including the guide space 22 where the source PCB 32 is located and a portion of the upper surface of the bottom cover 90 and surrounding a portion of the upper front surface of the liquid crystal panel 30 supported on the panel guide 20 and a plurality of second frame members 10B surrounding a portion of the lower side of the liquid crystal panel 30 supported on the panel guide 20.

Figure 5:
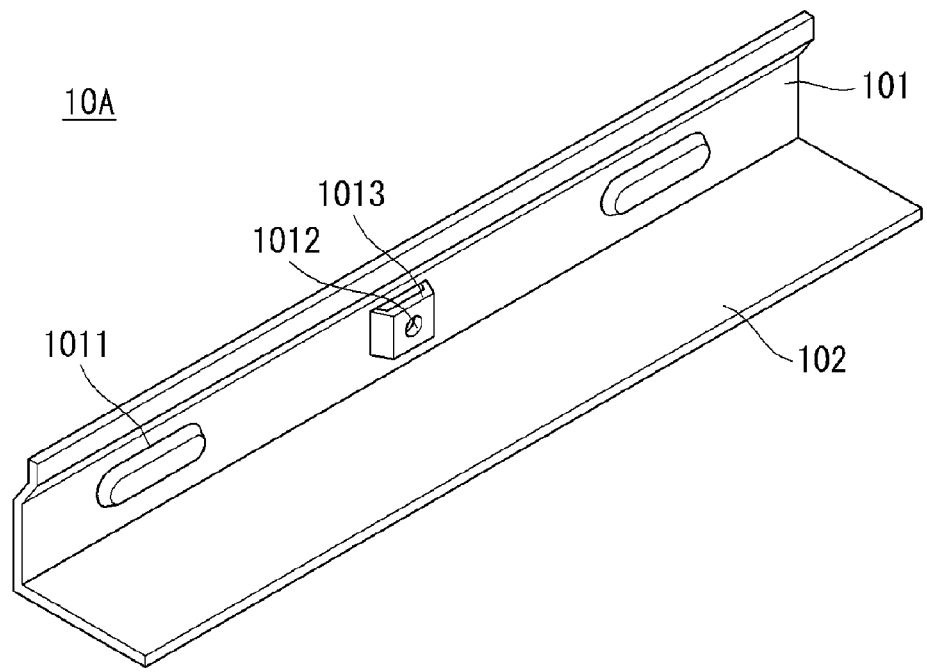
FIG. 5 is a perspective view of a first frame member constituting the top case.
Figure 11A:
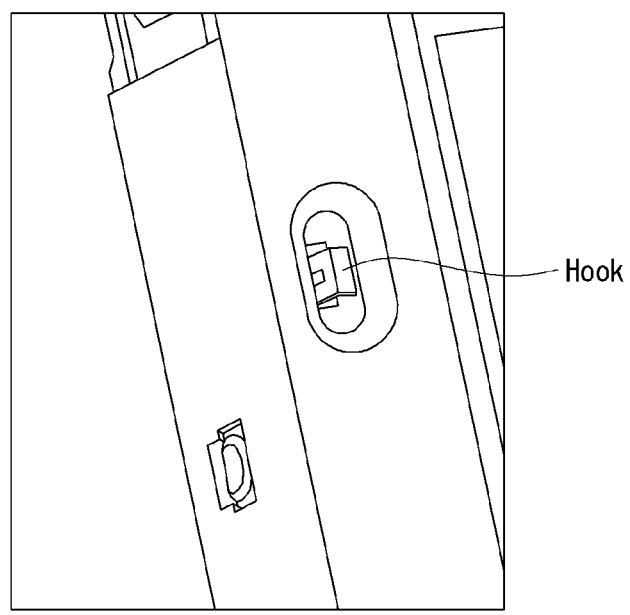
FIGS. 11a and 11b are views illustrating the fastening of a hook.
Figure 11B:
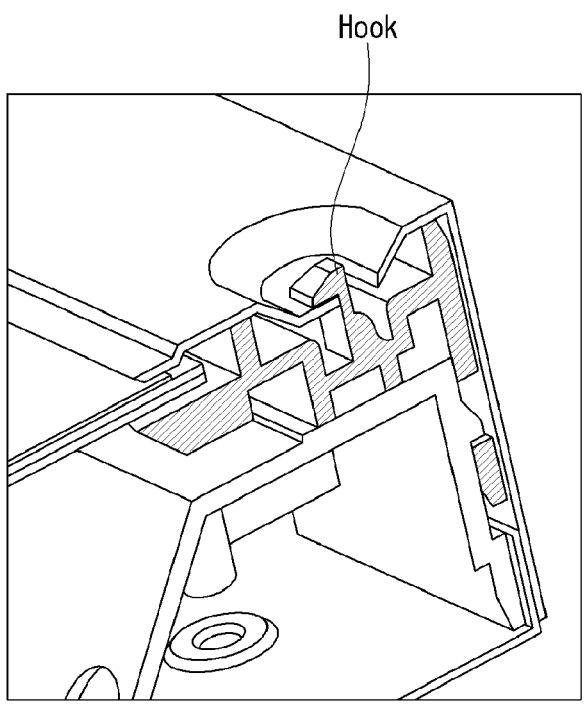
Figure 12:
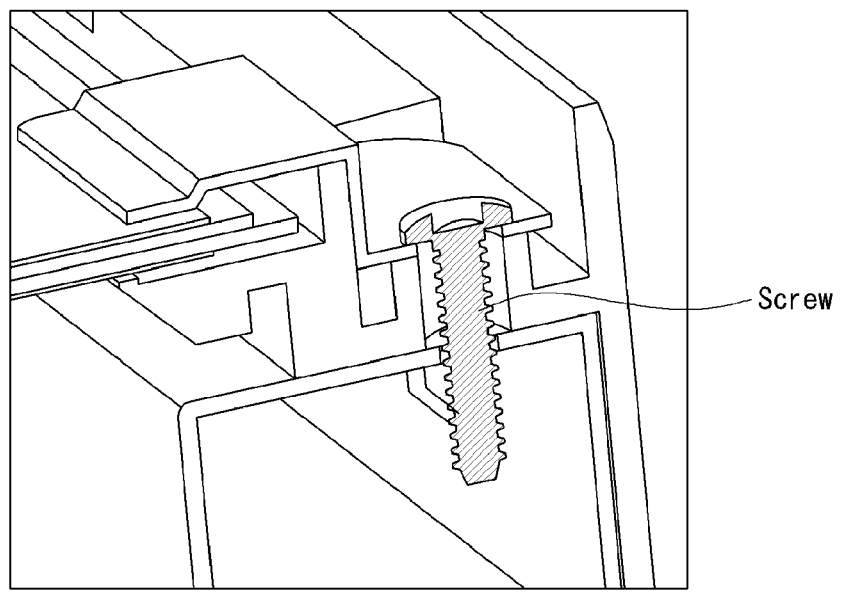
FIG. 12 is a view illustrating the fastening of a screw.

As shown in FIG. 5, the first frame member 10A is formed in an L-shape having a first plane 101 and a second plane 102 which are bent at right angles. The first plane 101 is fastened so as to face a portion of the upper front surface of the liquid crystal panel 30 and a portion of the upper front surface of the panel guide 20, and the second plane 102 is fastened so as to face a portion of the upper surface of the panel guide 20 and a portion of the upper surface of the bottom cover 90, thereby fixing the liquid crystal panel 30, the panel guide 20, and the bottom cover 90 from the top. The first plane 101 is provided with a fastening unit 1013 having a fastening groove 1012 for fastening to the panel guide 20. The first plane 101 may be fastened to the panel guide 20 by various methods. For example, as shown in FIGS. 11a and 11b, the first plane 101 and the panel guide 20 may be fastened by passing a hook formed on the panel guide 20 through the fastening groove 1012, or as shown in FIG. 12, may be fastened through a screw. Also, as shown in FIG. 7, the first plane 101 is provided with contact projections 1011 so as to contact the source COF 34 at the time of fastening. The contact projections 1011 are brought in contact with one side of the source COF 34 so as to correspond to the heat dissipation pad 36 with the source COF 34 interposed therebetween. The heat dissipation pad 36 serves to emit heat generated in the internal circuits, such as the source COF 34, the source PCB 32 connected to the source COF 34, and so forth. The first frame member 10A increases an effect of heat dissipation of the circuits by diffusing the heat conducted through the contact projections 1011. The second plane 102 is brought in contact with the electromagnetic wave emission pad 38 bonded to the source PCB 32 as shown in FIG. 8 at the time of fastening. The first frame member 10A provides a broad space for allowing electromagnetic waves to exit by contacting the electromagnetic wave emission pad 38, thus improving the effect of protecting the internal circuits from EMI. In FIGS. 7 and 8, reference numeral "30A" represents the upper substrate, and reference numeral "30B" represents the lower substrate. In FIG. 8, reference numeral "PAD" represents a fastening pad portion for preventing scratches from being generated on the liquid crystal panel 30 and making fastening easier when coupling the liquid crystal panel 30 and the equipment 10A and 20.

Figure 6:
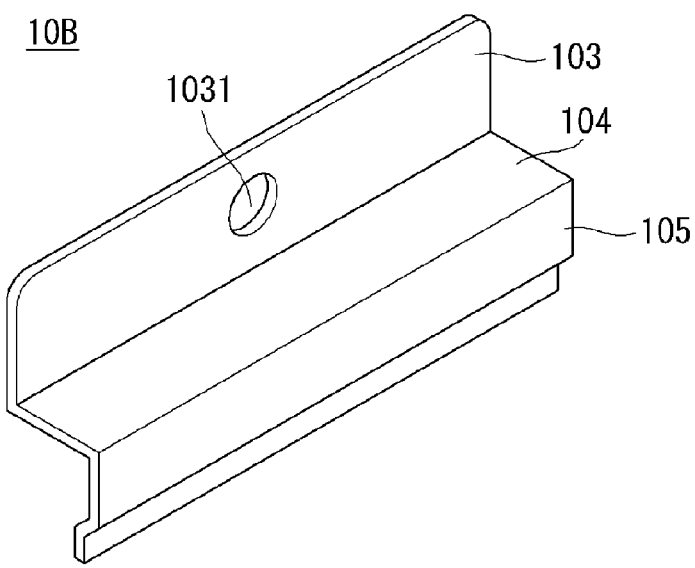
FIG. 6 is a perspective view of a second frame member constituting the top case.

As shown in FIG. 6, the second frame member 10A is formed in a Z-shape having first to third planes 103, 104, and 105 which are bent at right angles. The second frame member 10B is fastened so as to face a portion of the lower front surface of the liquid crystal panel 30 and a portion of the lower front surface of the panel guide 20, thereby fixing the liquid crystal panel 30 and the panel guide 20 from the bottom. The first plane 103 is provided with a fastening groove 1031 for fastening to the panel guide 20. The first plane 103 may be fastened to the panel guide 20 in various methods. For example, as shown in FIGS. 11a and 11b, the first plane 103 and the panel guide 20 may be fastened by passing a hook formed on the panel guide 20 through the fastening groove 1031, or as shown in FIG. 12, may be fastened through a screw.

The first frame member 10A and the second frame member 10B are separately molded, and physically separated from each other and fix the liquid crystal panel 30 and the like. The first and second frame members 10A and 10B are made of materials that can be manufactured by press molding or injection molding. In case of manufacturing by press molding, the first and second frame members 10A and 10B may be made of EGI (Electrolytic Galvanized Iron) or SUS (Stainless Steel). In case of manufacturing by injection molding, the first and second frame members 10A and 10B may be made of any one of ABS (Acronitrile Butadiene Styrene) resin, HIPS (High Impact Poly Styrene) resin, and PC (Poly Carbonate) resin. In this way, by fixing the liquid crystal panel 30 or the like by use of the frame members 10A and 10B physically separated from each other, production costs including material cost and packaging cost are reduced and assembling efficiency is greatly improved, compared to fixing the liquid crystal panel 30 or the like in a conventional rectangular frame shape. Further, a welding or screwing process for the rectangular frame shape may be omitted.

Figure 9:
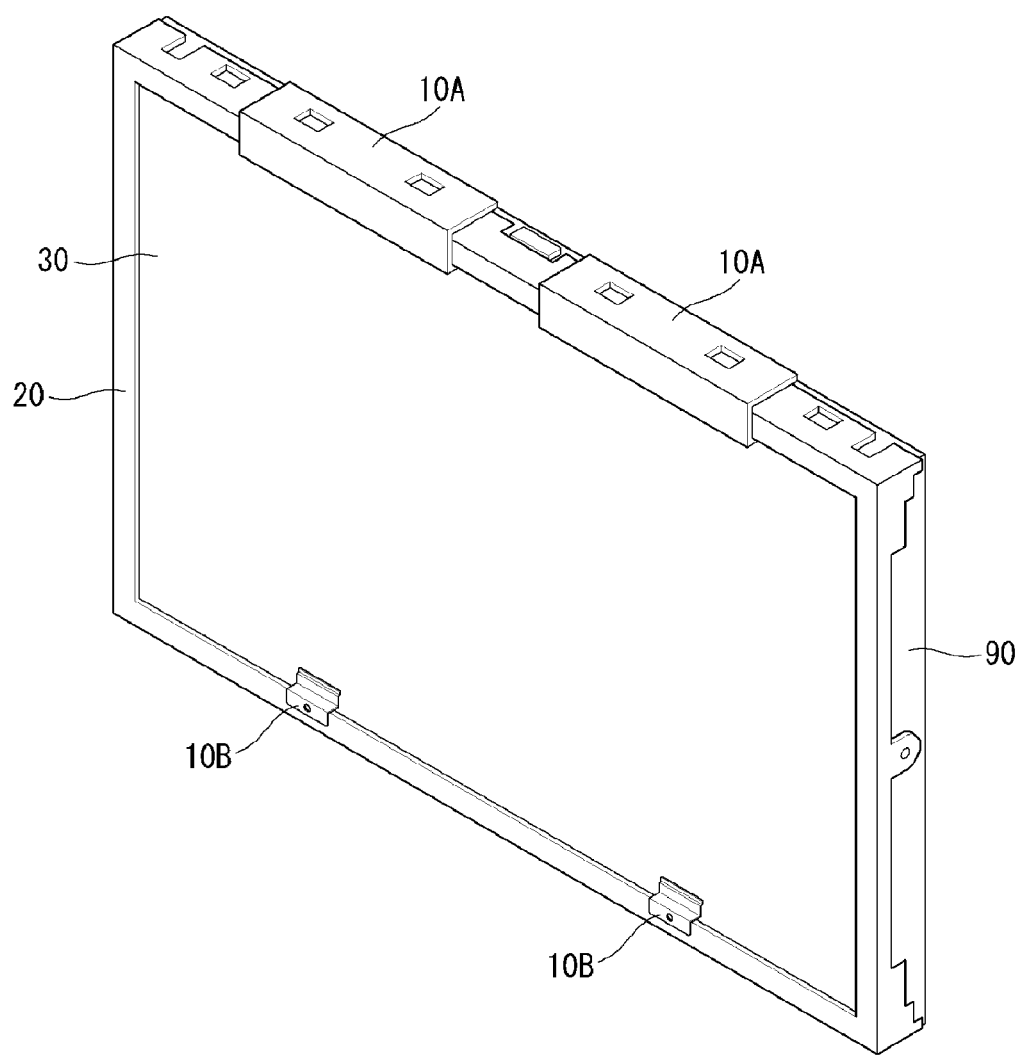
FIG. 9 is a view for explaining that the first frame member is divided into two or more and fastened.

On the other hand, with the trend of a large-size liquid crystal panel 30, the top case 10 may include two or more first frame members 10A and a plurality of second frame members 10B as shown in FIG. 9. As the liquid crystal panel 302 increases in size, the size of the source PCB 32 also increases. If the size of the source PCB 32 is increased much, the source PCB 32, which has an increased size as mentioned above, cannot be handled by existing automatic mounting equipment such as surface mount technology (SMT) equipment because the equipment is designed for a source PCB having a size smaller than the large-size source PCB 32. Owing to this, the source PCB 32, which has an increased size in accordance with the large-size trend, is divided into two or more. In this case, the first frame member 10A, too, can be divided into a plurality of parts according to the division number of the source PCB 32.

Figure 10:
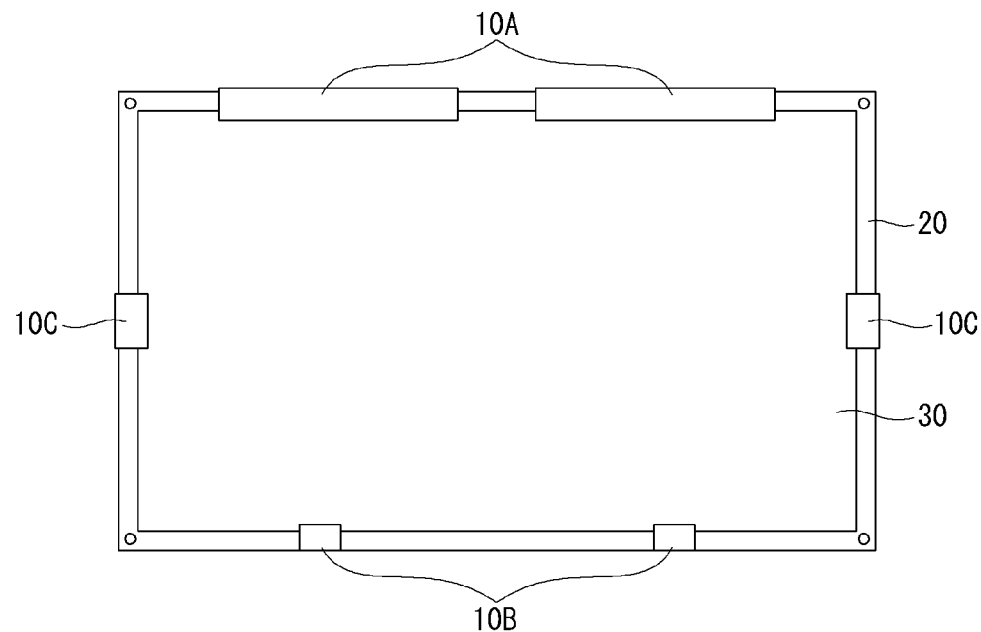
FIG. 10 is a view for explaining that a third frame member surrounding a portion of the left and right sides of a liquid crystal panel is added to FIG. 9.

Moreover, with the trend of a large-size liquid crystal panel 30, the top case 10 may further include a plurality of third frame members 10C surrounding a portion of the left and right sides of the liquid crystal panel 30 supported on the panel guide 20 as shown in FIG. 10, in addition to the first and second frame members 10A and 10B of FIG. 9. The third frame member 10C fixes the components including the liquid crystal panel 30 more tightly in an assembling process of the liquid crystal display.

Figure 13:
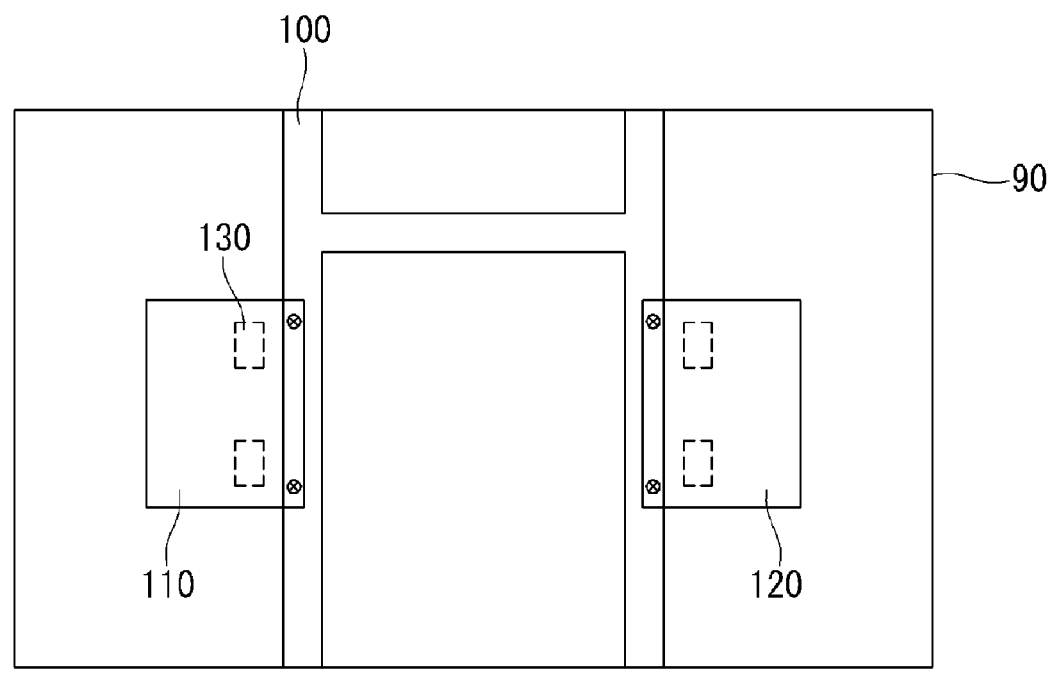
FIG. 13 is a view schematically showing an arrangement structure of the components on the rear surface of a bottom cover made of a plastic material.
Figure 14:
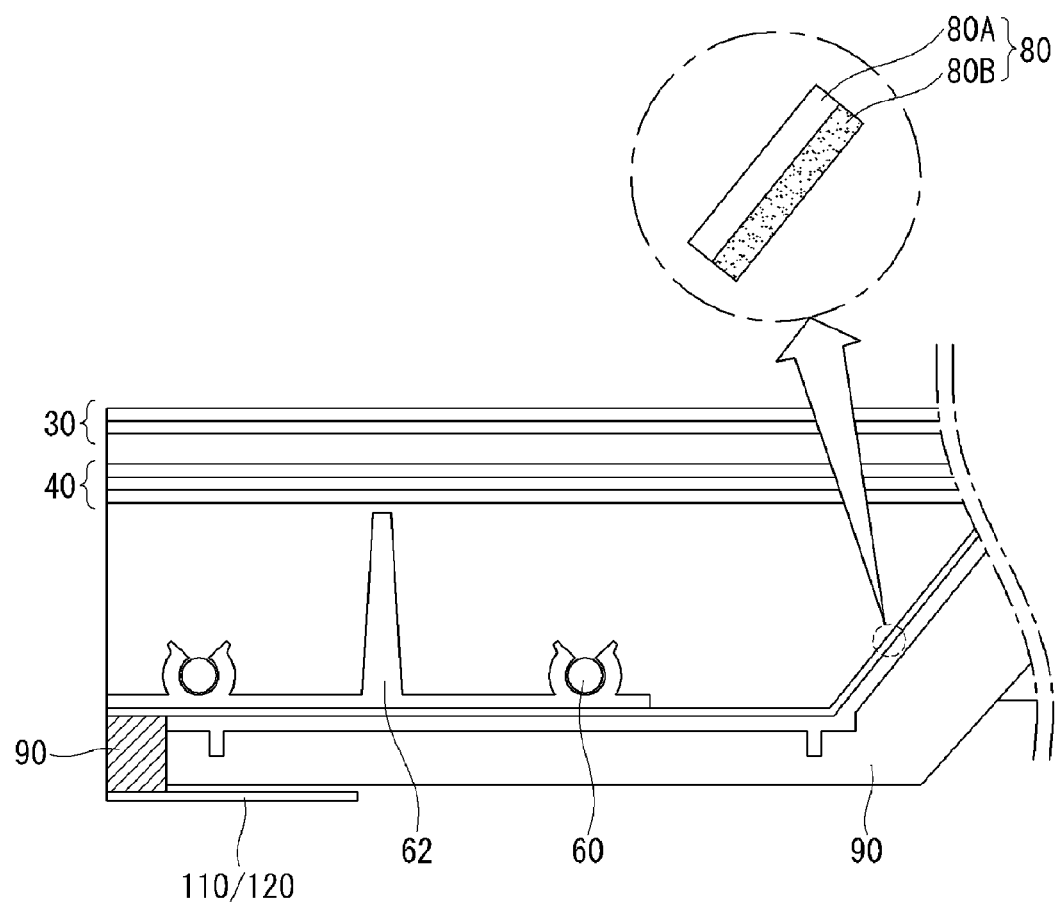
FIG. 14 is a view showing a scheme for securing a ground area in a case where the bottom cover is made of a plastic material.

Referring to FIGS. 13 and 14, the bottom cover 90 may be formed of a plastic material for light weight and reduction of manufacturing costs. In this case, the ground area is decreased as much as the size of the bottom cover 90, compared to forming the bottom cover 90 of a grounded (connected to ground) metal material. Thus, a grounded metal bar 100 is installed on the rear surface of the bottom cover 90, and the first and second control boards 110 and 120 are connected to this metal bar 100, thereby eliminating electromagnetic waves or static electricity generated from the first and second control boards 110 and 120. However, there is a limitation in increasing the installation area of the metal bar 100 in terms of lightweight, and therefore it is impossible to secure a sufficient ground area by the metal bar 100 alone.

Hence, in the present invention, the reflective sheet 80 is formed by a first layer 80A having a reflective material and facing the lamps 60 and a second layer 80B having a conductive material such as aluminum and facing the bottom surface of the bottom cover 90. Also, a plurality of holes are formed in the bottom cover 90 so as to face the first and second control boards 110 and 120 positioned on the rear surface, thereby exposing the second layer 80b toward the rear surface of the bottom cover 90. Further, gaskets 130 made of a conductive material are inserted into the holes to electrically connect the second layer 80B of the reflective sheet 80 to the first and second control boards 110 and 120. By this, the present invention can increase the ground area as much as the area of the reflective sheet 80, and therefore can make up for electrical disadvantages caused by an insufficient ground area in a case where the bottom cover 90 is formed of a plastic material. Moreover, the present invention can increase optical reflection efficiency of the reflective sheet 80 that reflects light toward the liquid crystal panel 30 with the use of the second layer 80B.

As described in detail above, the liquid crystal display according to the present invention can reduce production costs including material cost and packaging cost, compared to fixing the liquid crystal panel and the like in a conventional rectangular frame shape, by fixing the liquid crystal panel and the like by use of frame members physically separated from each other. In addition, the present invention can greatly improve working efficiency since a welding or screwing process for the rectangular frame shape can be omitted.

Furthermore, the liquid crystal display according to the present invention can make up for electrical disadvantages caused by an insufficient ground area in a case where the bottom cover 90 is formed of a plastic material by performing an aluminum coating process on the rear surface of an existing reflective sheet and electrically connecting this aluminum coating surface to the control boards on the rear surface of the bottom cover.

It will be understood by those skilled in the art that various changes and modifications may be applicable within a range not departing from the technical idea of the invention. Accordingly, the technical scope of the present invention is not limited to the detailed description of the specification, but should be defined by the accompanying claims.

What is claimed is:

1. A liquid crystal display, comprising:
a liquid crystal panel;
a film member having a source IC for driving the liquid crystal panel mounted therein;
a source PCB electrically connected to the liquid crystal panel through the film member;
lamps for generating light to be irradiated onto the liquid crystal panel;
a panel guide guiding the liquid crystal panel so as to be stacked in a rectangular frame shape and having a guide space where the source PCB is positioned provided on an upper outer surface thereof;
a bottom cover holding the lamps, and covering a portion of the sides of the panel guide; and
a top case having a first frame member surrounding both of the film member and the source PCB and fixing the liquid crystal panel at a portion of the upper side of the liquid crystal panel and a plurality of second frame members physically separated from the first frame member and fixing the liquid crystal panel at a portion of the lower side of the liquid crystal panel,
wherein the first frame member and the second frame members are separate pieces that are attached via the panel guide.

2. The liquid crystal display of claim 1, wherein the first frame member has an L-shape, comprising:
a first plane surrounding a portion of the upper front surface of the liquid crystal panel and a portion of the upper front surface of the panel guide; and
a second plane which is bent at a right angle to the first plane and surrounds a portion of the upper surface of the panel guide provided with the guide space and a portion of the upper surface of the bottom cover.

3. The liquid crystal display of claim 2, wherein the first plane is provided with a fastening groove for fastening to the panel guide and contact projections for contacting the film member at the time of fastening.

4. The liquid crystal display of claim 3, wherein the fastening is achieved by coupling a hook or by screwing.

5. The liquid crystal display of claim 3, wherein a heat dissipation pad is bonded to one side of the film member; and
the contact projections are brought into contact with the other side of the film member, which is opposite to the one side, so as to correspond to the heat dissipation pad.

6. The liquid crystal display of claim 2, wherein an electromagnetic wave emission pad is bonded to one side of the source PCB; and
the second plane is brought into contact with the electromagnetic wave emission pad.

7. The liquid crystal display of claim 1, wherein the second frame member has a Z-shape, comprising first to third planes which are bent at right angles,
the first plane being provided with a fastening groove for fastening to the panel guide.

8. The liquid crystal display of claim 7, wherein the fastening is achieved by coupling a hook or by screwing.

9. The liquid crystal display of claim 1, wherein the fist and second frame members are made of EGI (Electrolytic Galvanized Iron) or SUS (Stainless Steel);
or
the first and second frame members are made of any one of ABS (Acronitrile Butadiene Styrene) resin, HIPS (High Impact Poly Styrene) resin, and PC (Poly Carbonate) resin.

10. The liquid crystal display of claim 1, wherein the number of the first frame member is the same as the number of the source PCB.

11. The liquid crystal display of claim 1, wherein the top case further comprises a plurality of third frame members that are physically separated from the first and second frame members and fix the liquid crystal panel at a portion of the left and right sides of the liquid crystal panel.

12. The liquid crystal display of claim 1, further comprising:
a reflective sheet disposed between the bottom cover and the lamps and reflecting light incident from the lamps toward the liquid crystal panel;
a metal bar installed on the rear surface of the bottom cover and connected to the ground; and
control boards electrically connected to the metal bar and the source PCB,
the reflective sheet including a first layer having a reflective material and facing the lamps and a second layer having a conductive material and facing the bottom cover,
the bottom cover being provided with holes through which conductive gaskets pass, and
the control boards and the second layer being electrically connected to each other through the conductive gaskets interposed therebetween.

* * * * *